(12) United States Patent
Utsunomiya

(10) Patent No.: US 6,172,851 B1
(45) Date of Patent: Jan. 9, 2001

(54) FLYING MAGNETIC HEAD SLIDER FOR A MAGNETIC DISK DRIVE

(75) Inventor: Motoyasu Utsunomiya, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/353,028

(22) Filed: Jul. 13, 1999

Related U.S. Application Data

(62) Division of application No. 08/953,647, filed on Oct. 17, 1997, now Pat. No. 5,953,181.

(51) Int. Cl.$^7$ ........................................... G11B 5/60
(52) U.S. Cl. ............................................. 360/236.3
(58) Field of Search ........................ 360/103, 235.6, 360/236, 236.3

(56) References Cited

U.S. PATENT DOCUMENTS

| | | |
|---|---|---|
| 5,353,180 | 10/1994 | Murray . |
| 5,406,432 | 4/1995 | Murray . |
| 5,739,981 * | 4/1998 | Cha et al. ................ 360/235.6 |
| 5,894,379 * | 4/1999 | Koishi et al. ................ 360/103 |
| 5,926,343 * | 7/1999 | Dorius et al. ................ 360/103 |
| 5,953,181 * | 9/1999 | Utsunomiya ................ 360/235.6 |

FOREIGN PATENT DOCUMENTS

| | | |
|---|---|---|
| 61-160885 | 7/1986 | (JP) . |
| 3-125378 | 5/1991 | (JP) . |
| 4-228157 | 8/1992 | (JP) . |

* cited by examiner

Primary Examiner—Robert S. Tupper
(74) Attorney, Agent, or Firm—Sughrue, Mion, Zinn, Macpeak & Seas, PLLC

(57) ABSTRACT

A magnetic head slider of the present invention includes a generally C-shaped leading rail extending from the leading edge of an air bearing surface and concave toward the trailing edge of the same. A pair of trailing rails extend from substantially the center of the concavity of "C" of the leading rail and flared away from each other toward the trailing edge. The trailing rails are spaced by a preselected distance from each other in the vicinity of the concavity of the trailing rail, then extend toward the trailing edge while bending away from each other, and then respectively extend toward the right and left ends of the trailing edge while sequentially increasing in width. Vacuum to be generated is controlled on the basis of the above distance and the bending angle of the trailing rails.

10 Claims, 12 Drawing Sheets

FLYING MAGNETIC HEAD SLIDER FOR A MAGNETIC DISK DRIVE

This is a divisional of application Ser. No. 08/953,647 filed Oct. 17, 1997, the disclosure of which is incorporated herein by reference, now U.S. Pat. No. 5,953,181.

BACKGROUND OF THE INVENTION

The present invention relates to a magnetic disk drive and, more particularly, to a flying magnetic head slider capable of recording and reproducing data while flying slightly above a recording medium due to an air bearing.

A magnetic disk drive applicable to a computer as an external storage includes a magnetic head for recording and reproducing data out of a recording medium. The head is mounted on a magnetic head slider facing the recording medium and capable of flying to a preselected height above the medium. While the medium spins, the resulting viscous flow of air is born by an air bearing surface facing the medium. The slider therefore flies slightly above the medium due to an air bearing available with the air bearing surface. The head is mounted on the air outlet end portion of the air bearing surface and oriented toward the medium. During the flight of the slider, the head records or reproduces data in or out of the medium without contacting the medium.

The slider of the type described is brought to a desired track by a positioner while seeking the medium. Specifically, with such a rotary actuator type positioner, to access data, the slider seeks the medium from the innermost circumference to the outermost circumference of the track. This brings about a problem that the pressure acting on the air bearing surface depends on the radial position of the track of the medium because the velocity of the viscous flow of air depends on the radial position of the track. As a result, the flying height of the slider differs from one radial position to another radial position of the track. Moreover, the yaw angle between the direction tangential to the medium and the longitudinal axis of the slider differs from the innermost circumference to the outermost circumference. A change in yaw angle causes the air stream flowing along the air bearing surface to vary, thereby varying the pressure distribution. This also causes the flying height of the slider to fluctuate.

A change in the flying height of the slider directly translates into a change in electromagnetic transduction efficiency available with the head and thereby deteriorates a signal-to-noise ratio. To implement high density CDR (Constant Density Recording) required of a magnetic disk, it is necessary to maintain a high BPI (Bit Per Inch) over the entire track area. It is therefore extremely important to guarantee the constant flying height of the slider over the entire track area.

Technologies relating to the present invention are also disclosed in, for example, Japanese Patent Laid-Open Publication Nos. 61-160885, 3-125378 and 4-228157.

SUMMARY OF THE INVENTION

It is therefore an object of the present invention to provide a flying magnetic head slider allowing a minimum of change to occur in flying height without regard to the radial track position and thereby ensuring a stable flying height over the entire track area.

It is another object of the present invention to provide a flying magnetic head slider allowing a minimum of change to occur in recording and reproducing characteristics and thereby implementing high density CDR.

In accordance with the present invention, a magnetic head slider having an air bearing surface and capable of flying due to an air bearing between the air bearing surface and a recording medium includes a leading rail formed at an air inlet side on the air bearing surface. A pair of trailing rails extend from substantially the center of the leading rail toward an air outlet, then bend away from each other, and then respectively extend toward the right end and left end of the air outlet end while sequentially increasing in width.

Also, in accordance with the present invention, a magnetic head slider having an air bearing surface and capable of flying due to an air bearing between the air bearing surface and a recording medium includes a generally C-shaped leading rail formed at an air inlet end on the air bearing surface and concave toward an air outlet end. A pair of trailing rails extend from substantially the center of the concavity of the leading rail toward the air outlet end, then bend away from each other, and then respectively extend to the right end and left end of the air outlet end while sequentially increasing in width.

Furthermore, in accordance with the present invention, a magnetic header slider having an air bearing surface and capable of flying due to an air bearing between the air bearing surface and a recording medium includes an air inlet end and an air outlet end formed by separating the air bearing surface. A generally E-shaped leading rail is formed at the air inlet end and concave toward the air outlet end. A pair of triangular trailing rails are respectively located at the right end and left end of the air outlet end.

Moreover, in accordance with the present invention, a magnetic head slider having an air bearing surface and capable of flying due to an air bearing between the air bearing surface and a recording medium includes an air inlet end and an air outlet end formed by separating the air bearing surface. A generally E-shaped leading rail is concave toward the air outlet end. Three subrails extend toward the air outlet and are separated from each other by a pair of parallelogrammatic recesses which are symmetrical to each other with respect to the longitudinal axis of the slider. A pair of triangular trailing rails are respectively located at the right end and left end of the air outlet end and symmetrical to each other with respect to the longitudinal axis of said slider.

In addition, in accordance with the present invention, a slider having an air bearing surface including an air inlet end and an air outlet end, and capable of flying due to an air bearing between the air bearing surface and a recording medium includes three leading rails respectively extending out from the right end, left end and center of the air inlet end. A pair of side rails extend toward the air outlet end and are respectively formed at the right end and left end of the slider. The side rails each extends while sequentially decreasing in width, and terminates before reaching the air outlet end. A center rail extends from the center of the air inlet end toward the air outlet end and then bifurcates into a pair of branch rails. The branch rails respectively extend to the right end and left end of the air outlet end while sequentially increasing in width.

BRIEF DESCRIPTION OF THE DRAWINGS

The above and other object, features and advantages of the present invention will become apparent from the following detailed description taken with the accompanying drawings in which.

DESCRIPTION OF THE PREFERRED EMBODIMENTS

Figure 1A:
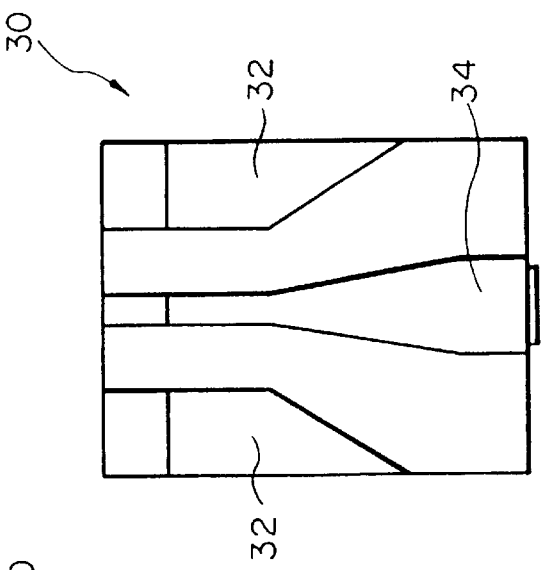
FIGS. 1A and 1B are respectively a plan view and a front view showing a conventional double-rail type magnetic head slider.
Figure 2A:
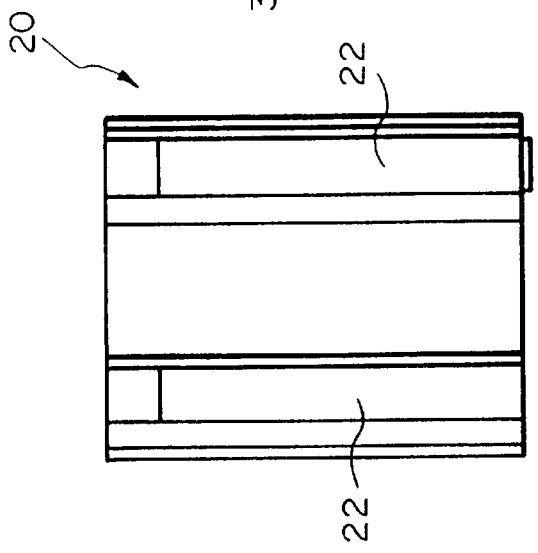
FIGS. 2A and 2B are respectively a plan view and a front view showing a conventional double-rail type TPC (Transverse Pressure Contour) magnetic head slider.
Figure 3A:
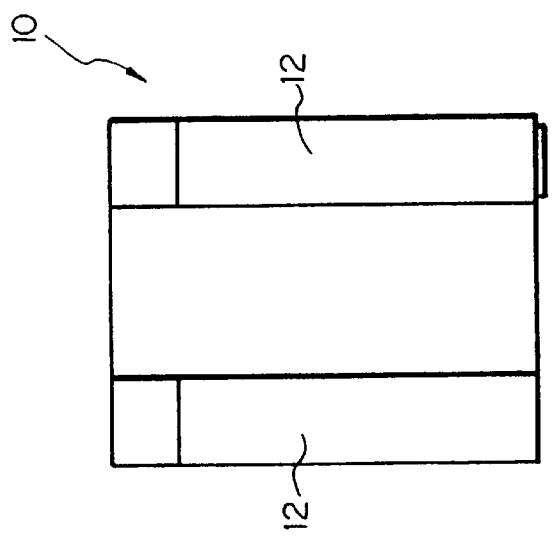
FIGS. 3A and 3B are respectively a plan view and a front view showing a conventional triple-rail type magnetic head slider.
Figure 1B:
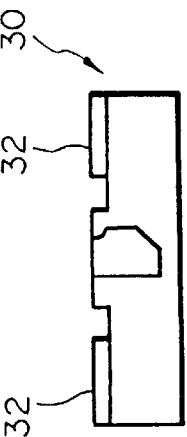
Figure 2B:
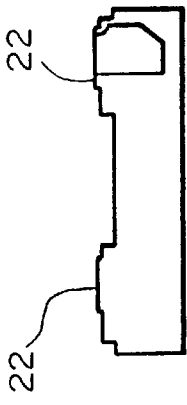
Figure 3B:
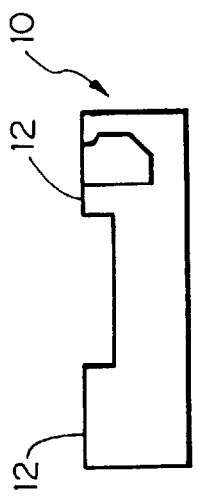

To better understand the present invention, brief reference will be made to conventional flying magnetic head sliders, shown in FIGS. 1A, 1B, 2A, 2B, 3A and 3B. FIGS. 1A and 1B show a double-rail magnetic head slider 10 having two parallel rails or side rails arranged at both sides of an air bearing surface. FIGS. 2A and 2B show a TPC magnetic head slider 20 having two parallel side rails 22. In this head slider 20, each side rail 22 has a finely stepped configuration in order to generate vacuum. FIGS. 3A and 3B show a triple-rail magnetic head slider 30 having a pair of side rails 32 arranged at both sides of an air bearing surface, and a single center rail 34 intervening between the side rails 32. Among such conventional sliders, the head slider shown in FIGS. 1A and 1B will be described more specifically hereinafter.

Figure 4:
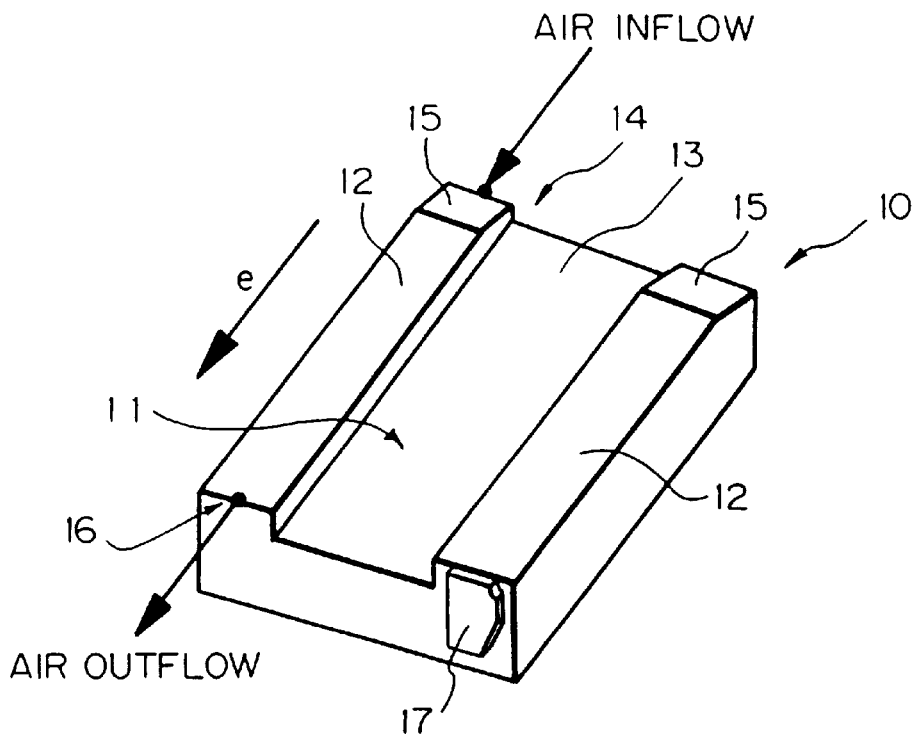
FIG. 4 is a perspective view showing a conventional double-rail type magnetic head slider.

As shown in FIG. 4, the slider 10 has a recess 13 formed in the side of the slider 10 facing a recording medium, not shown. The recess 13 has a preselected width and extends throughout the slider 10 in the lengthwise direction of the slider 10, forming the air bearing surface 11. The parallel side rails 12 are arranged at both sides of the recess 13 and extend in the direction (arrow e) in which air flows due to the spinning of the recording medium. The rails 12 each has a tapered end at the air inlet side 14 of the head 10. A record/reproduce head 17 is mounted on the other end of one of the rails 12 at the air outlet side 16 of the head 10. In operation, air flows along the side rails 12 via the tapered ends 15 due to the rotation of the medium, forming an air film between the head 10 and the medium. As a result, the slider 10 is caused to fly above the medium.

Figure 5:
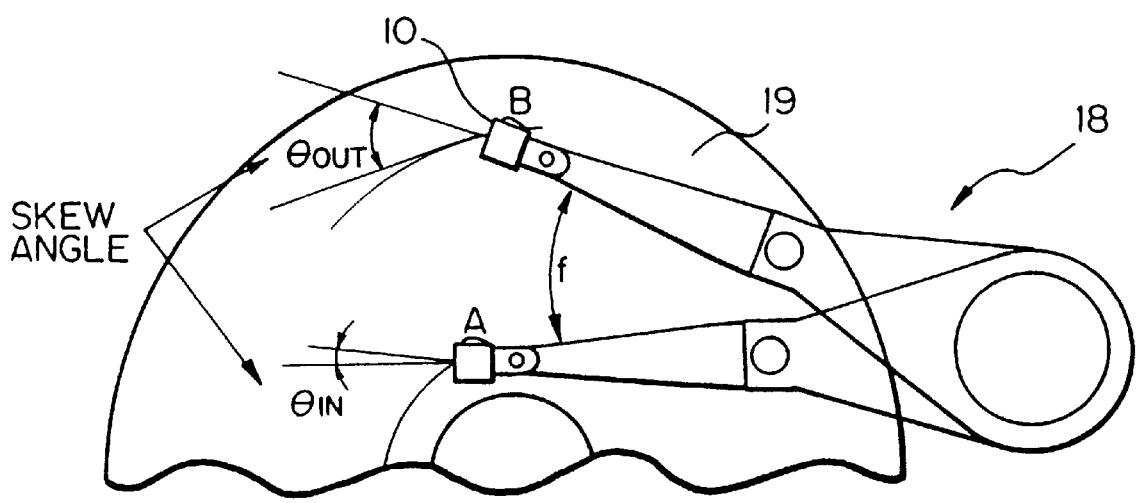
FIG. 5 is a plan view demonstrating how a magnetic head slider accesses a recording medium.

FIG. 5 shows the locus of the above head slider 10 carried on a rotary actuator type positioner 18. As shown, the slider 10 is caused to seeks a recording medium 19 by the positioner 18 and is positioned above a desired track. Specifically, the positioner 18 carrying the slider 10 on its one end is rotated about the other end along the surface of the medium 1, as indicated by an arrow f in FIG. 5. To access data, the slider 10 with the head 17 seeks the medium 19 from the innermost circumference A to the outermost circumference B of the track.

The problem with the slider 10 is that the pressure acting on the air bearing surface 11 depends on the radial position of the track of the medium 19 because the velocity of the viscous flow of air depends on the radial position of the track. As a result, the flying height of the slider 10 differs from one radial position to another radial position of the track, as discussed earlier. Moreover, the yaw angle between the direction tangential to the medium 19 and the longitudinal axis of the slider 10 differs from the innermost circumference ($\theta_{in}$) to the outermost circumference ($\theta_{out}$). A change in Yaw angle causes the air stream flowing along the air bearing surface 11 to vary, thereby varying the pressure distribution. This also causes the lying height of the slider 10 to vary.

Preferred embodiments of the magnetic head slider in accordance with the present invention will be described hereinafter.

1st Embodiment

Figure 6A:
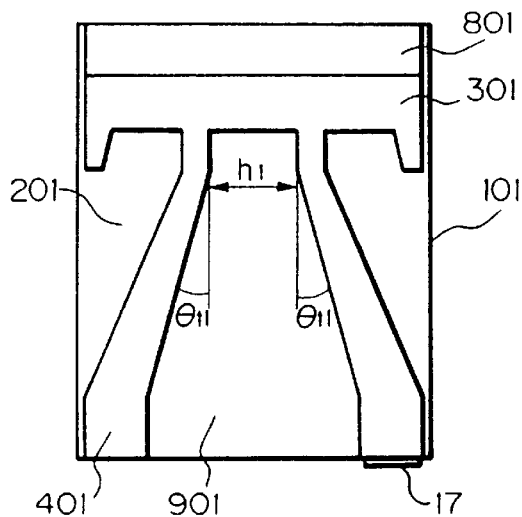
FIG. 6A is a plan view showing a first embodiment of the magnetic head slider in accordance with the present invention.
Figure 6B:
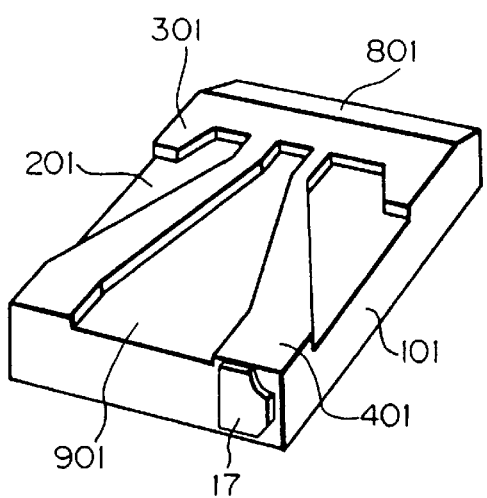
FIG. 6B is a perspective view of the first embodiment.
Figure 7:
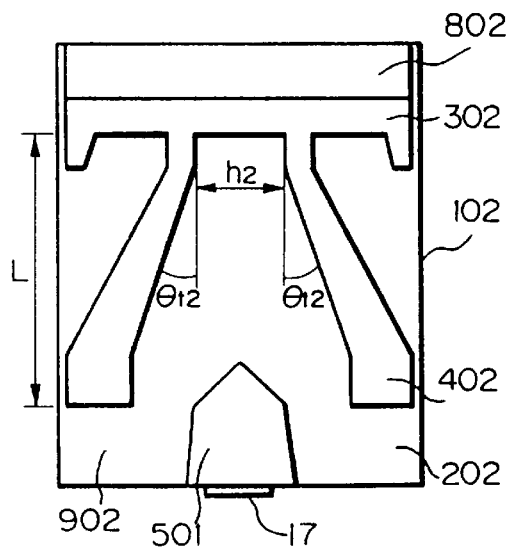
FIGS. 7 and 8 are plan views respectively showing a first and a second modification of the first embodiment.
Figure 8:
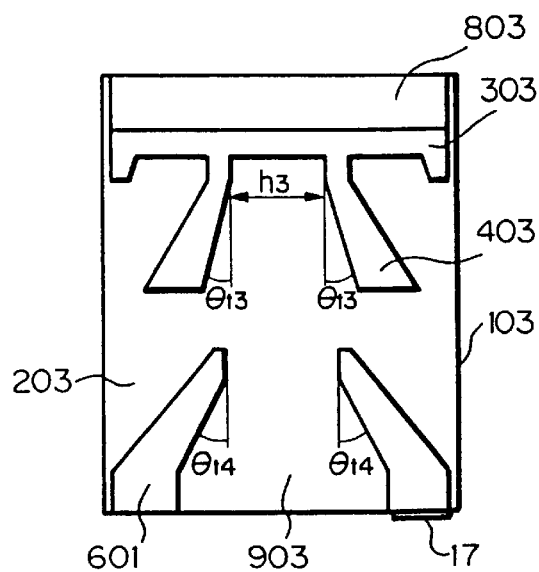

FIGS. 6A and 6B show a magnetic head slider embodying the present invention while FIGS. 7 and 8 respectively show a first and a second modification of the embodiment. There are shown in FIGS. 6A, 6B, 7 and 8 magnetic head sliders 101–103, air bearing surfaces 201–203, leading rails 301–303, trailing rails 401–403, a center rail 501, a trailing subrail 601, a magnetic head 17, tapered portions 801–803, and recesses 901–903. The sliders 101–103 each is connected to a head support mechanism, not shown, at its side opposite to the air bearing surface 201, 202 or 203.

As shown in FIGS. 6A and 6B, the leading rail 301 is positioned at the leading edge side of the slider 101 and provided with a generally C-shaped configuration concave toward the trailing edge of the slider 101. The trailing rail 401 extends from substantially the center of the concavity of the C-shaped configuration of the leading rail 301 while flaring generally in the form of a letter V. With an increase in the extension of the right and left ends of the leading rail 301 toward the trailing edge, the roll rigidity and the enclosing area of the reverse step surface increase, intensifying the vacuum. However, excessive extension would cause air to stagnate in the portions of the recess 901 between the right and left ends of the leading rail 301 and the flared trailing rail 401. In light of this, the right and left ends of the leading rail 301 should preferably be tapered toward the right and left ends of the slider 101.

The two portions of the flared trailing rail 401 (subrails hereinafter) are spaced from each other by a distance h1 in the vicinity of the leading rail 301. The two subrails are bent at an angle $\theta_{r1}$ away from each other while extending toward the trailing edge. Then, the subrails terminate at the trailing edge while sequentially increasing their width. Vacuum is controllable on the basis of the above distance h1 and angle $\theta_{r1}$. Specifically, vacuum will be intensified if the distance h1 and angle $\theta_{r1}$ are increased. However, when either one of the distance h1 and angle $\theta_{r1}$ is increased, the other cannot be increased. Ideally, the angle $\theta_{r1}$ should lie in the same range as the expected yaw angle in order to guarantee a desirable yaw angle characteristic. The distance h1 should preferably be selected on the basis of such an angle $\theta_{r1}$.

As shown in FIG. 7, the magnetic head slider 102 representative of the first modification is applied to a triple-pad type slider. As shown, the leading rail 302 is substantially identical in configuration with the leading rail 301 shown in FIGS. 6A and 6B. The trailing rail 402 extending from the leading rail 302 is similar to the trailing rail 401 shown in FIGS. 6A and 6B except for the following. The two subrails of the trailing rail 402 are spaced by a distance h2 and bent away from each other at an angle $\theta_{r2}$. Although the subrails of the trailing rail 402 extend toward the trailing edge as in the illustrative embodiment, they respectively terminate at the right and left ends of the slider 102 before reaching the trailing edge.

The subrails of the trailing rail 402 should have a length L preferably great enough to prevent the slider 102 from contacting a recording medium, not shown, at the maximum roll position of the slider 102. The center rail 501 is positioned at the center of the trailing edge and provided with an equilateral triangular configuration or a polygonal island-like configuration. The head 17 is mounted on the center rail 501. Preferably, the center rail 501 should be as close to a regular polygon as possible in order to reduce the variation of the pressure distribution ascribable to the variation of the yaw angle.

The above modification allows the distance h2 and angle $\theta_{r2}$ to be greater than he distance h1 and angle $\theta_{r1}$ of the embodiment. The slider 102 can therefore be so designed as to further reduce the peripheral speed dependency and yaw angle dependency of the flying height.

The magnetic head slider 103 shown in FIG. 8 and representative of the second modification enhances the free setting of the distance h1 and angle $\theta_{r1}$ of the illustrative embodiment and thereby further improves the peripheral speed characteristic and taw angle characteristic. As shown, the two subrails of the trailing rail 403 extending from the leading edge terminate halfway while the trailing subrail 601 extend from the trailing edge toward the trailing edge, as illustrated.

The subrails of the trailing rail 403 and the trailing subrails 601 are bent at angles $\theta_{r3}$ and $\theta_{r4}$, respectively. The angle $\theta_{r3}$ should preferably be smaller than the angle $\theta_{r4}$ in order to improve both the peripheral speed dependency and yaw angle dependency. Particularly, with this modification, both the peripheral speed dependency and yaw angle dependency can be improved with desirable balance because vacuum and yaw angle characteristic can be designed independently of each other to some degree due to the separate configuration of the leading rail 403.

Figure 16:
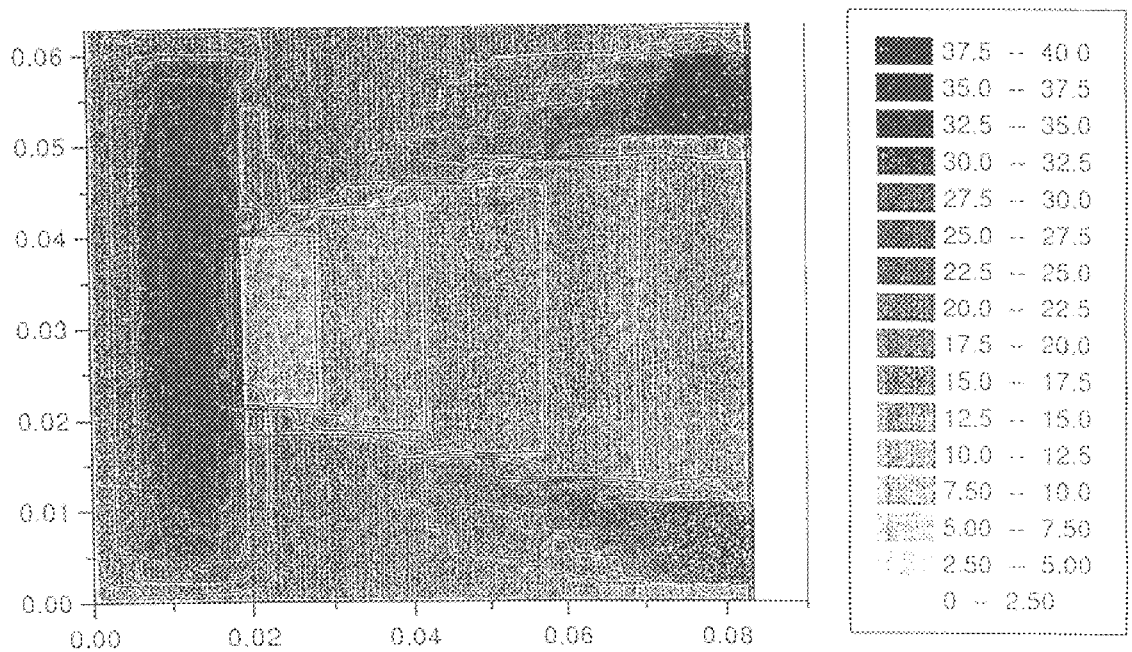
FIGS. 16–18 each shows a particular pressure distribution on an air bearing surface included in a magnetic head slider of the present invention.
Figure 17:
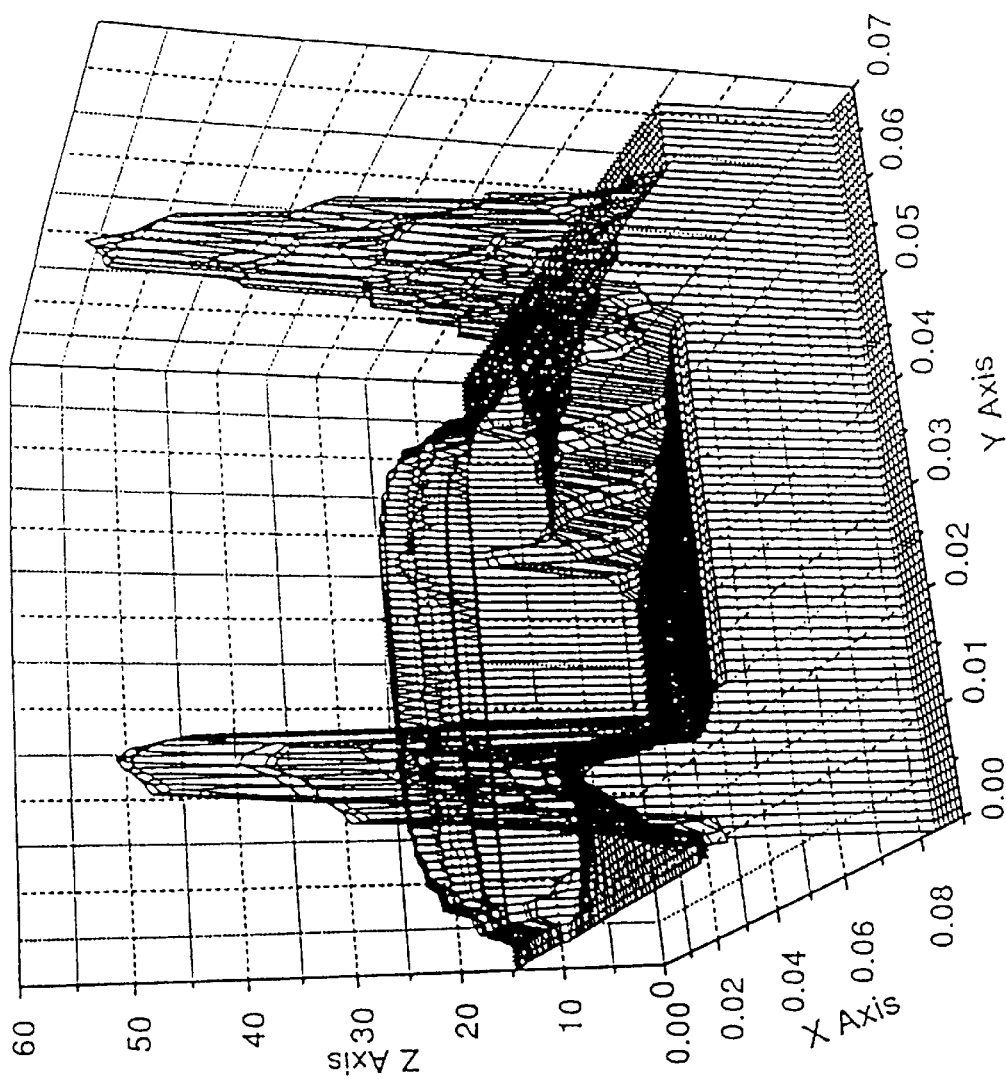
Figure 18:
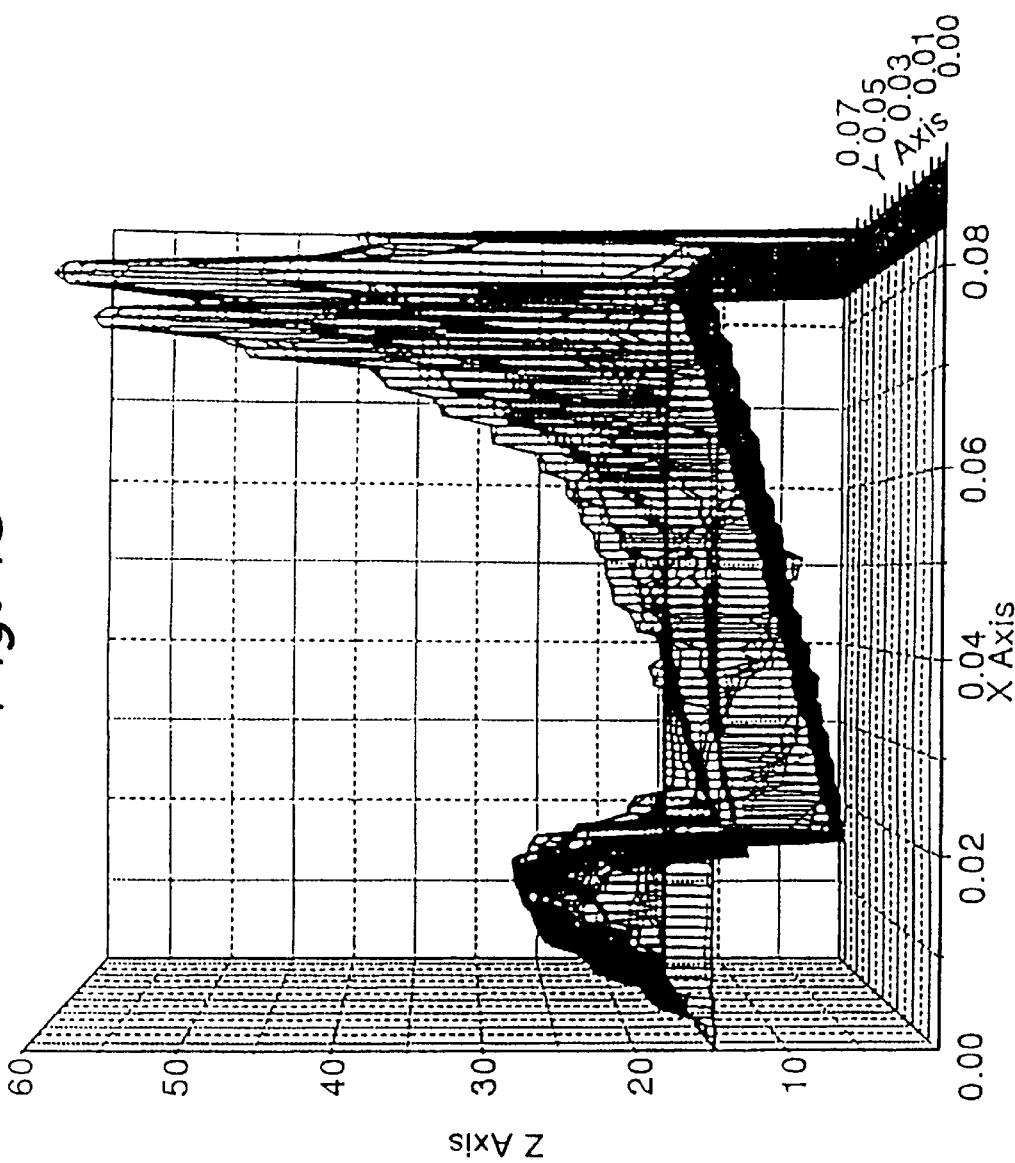
Figure 19:
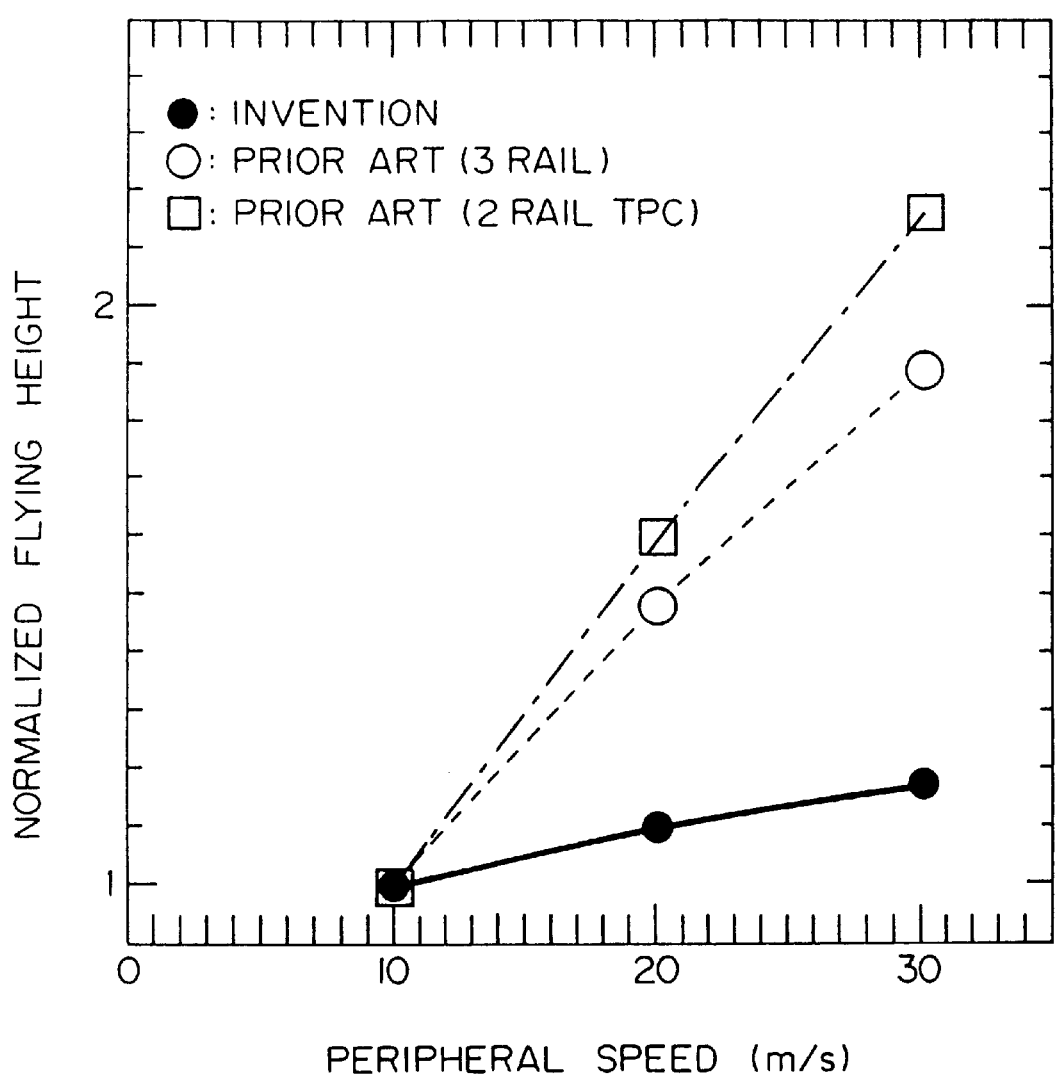
FIG. 19 shows the peripheral speed dependency of a flying height particular to the present invention.

As stated above, in the illustrative embodiment and its modifications, the C-shaped leading rail located at the leading edge of the air bearing surface defines a reverse step surface with its concavity. The right and left ends of the leading rail and the flared trailing rail extending from the center of the leading rail divide the reverse step surface into three portions. These three portions are respectively enclosed by the end portions of the leading rail and the trailing rail. FIGS. 16–18 show vacuum generated in each of the three enclosed portions of the reverse step surface. The negative load capacity (vacuum intensity Wn) increases with an increase in the velocity of the viscous flow of air and cancels the positive load capacity (flying force Wp). Therefore, the peripheral speed dependency of the flying height can be reduced so as to improve the uniformness of the flying height.

To ensure the reliability of a disk drive, it is necessary to improve the flying characteristic and lower CSS durability. For this purpose, the pressure load must be reduced in order to reduce the wear between the slider and the medium and the resistance to the flight at the time of start-up. However, with the conventional positive pressure sliders, a decrease in pressure load is apt to deteriorate air film rigidity and therefore tracking ability.

By contrast, with the vacuum type slider, a great positive load capacity is achievable despite the light load and guarantees sufficient air film rigidity. On the other hand, as shown in FIG. 22A, the generally V-shaped trailing rail has its two subrails inclined at an angle of $\pm\theta t$. Therefore, even when the yaw angle $\theta_Y$ of the slider varies due to a change in track position, the air stream coming in through the leading edge reaches the trailing edge more easily and does not noticeably vary the flow rate of air bearing. This allows the yaw angle dependency of the flying height to be reduced, and therefore ensures stable flight at the time of seek. This, coupled with the reduced peripheral speed dependency, realizes constant flight over the entire track area.

2nd Embodiment

Figure 9A:
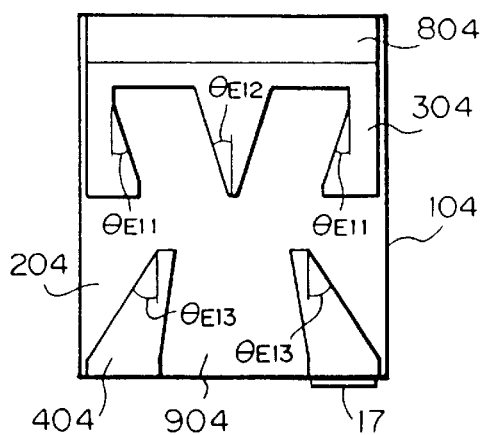
FIG. 9A is a plan view showing a second embodiment of the magnetic head slider in accordance with the present invention.
Figure 9B:
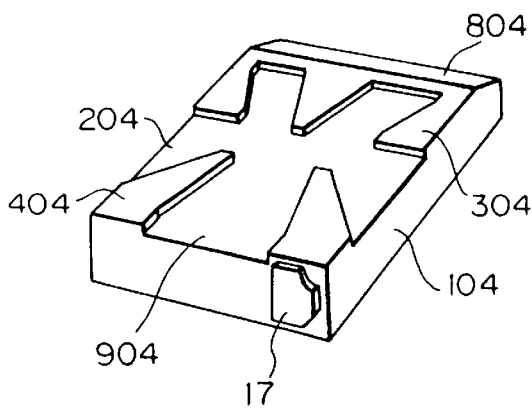
FIG. 9B is a perspective view of the second embodiment.

FIGS. 9A and 9B show a second embodiment of the present invention while FIGS. 10–13 respectively show a first to a fourth modification of the second embodiment. There are shown in FIGS. 9A, 9B and 10–13 magnetic head sliders 104–108, air bearing surfaces 204–208, leading rails 304–308, trailing rails 404–407, a center rail 502, the magnetic head 17, tapered portions 804–808, and recesses 904–908. The sliders 104–108 each is connected to a head support mechanism, not shown, at its side opposite to the air bearing surface 204, 205, 206, 207 or 208.

As shown in FIGS. 9A and 9B, the head slider 104 has the leading rail 304 extending from the leading edge toward the trailing edge generally in the form of a letter E. The two concavities or recesses of the E-shaped leading rail 304 are implemented as a pair of parallelograms symmetrical to each other with respect to the lengthwise axis of the slider 104. The above concavities form a generally V-shaped recess, as seen from the leading edge side. The angle of "V" of such a recess should preferably be great enough to prevent dust from staying in the recess. Although an increase in the area of the V-shaped recess intensifies vacuum, it reduces the rail area for generating a positive pressure. As a result, the roll and pitch rigidity decrease, and the flying height decreases to decrease the flying pitch angle.

The trailing rail 404 is implemented by a pair of triangular rails extending from the right and left ends of the trailing edge. The triangular rails are symmetrical to each other with respect to the longitudinal axis of the slider 104 and are flared away from each other, as seen from the leading edge side.

The trailing rails 404 each is inclined by an angle of $\theta_{E13}$ relative to the longitudinal axis of the slider 104. The right and left rails included in the leading rail 304 each is inclined by an angle of $\theta_{E11}$ relative to the above axis while the center rail is inclined by an angle $\theta_{E12}$. These angles $\theta_{E11}$–$\theta_{E13}$ should preferably by equal to or greater than the expected yaw angle.

Figure 10:
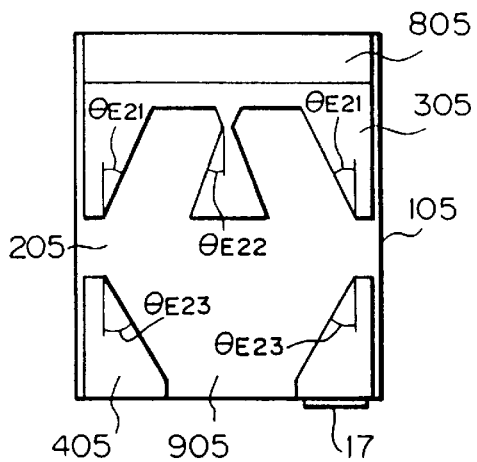
FIGS. 10–13 are plan views respectively showing a first to a fourth modification of the second embodiment.

As shown in FIG. 10, in the slider 105 representative of the first modification, the leading rail 305 is similar in configuration to the leading rail 304 of the embodiment except that it forms a generally V-shaped recess, as seen from the trailing edge side. Again, the angle of "V" should preferable be great enough to prevent dust from staying in the recess. The trailing rails 405 are similar to the trailing rails 404 of the embodiment except that they are flared, as seen from the trailing edge side.

The trailing rails 405 each is inclined by an angle of $\theta_{E23}$ relative to the longitudinal axis of the slider 105. The right and left rails included in the leading rail 305 each is inclined by an angle of $\theta_{E21}$ relative to the above axis while the center rail is inclined by an angle of $\theta_{E22}$. These angles $\theta_{E21}$–$\theta_{E23}$ should preferably be equal to or greater than the expected yaw angle.

Figure 11:
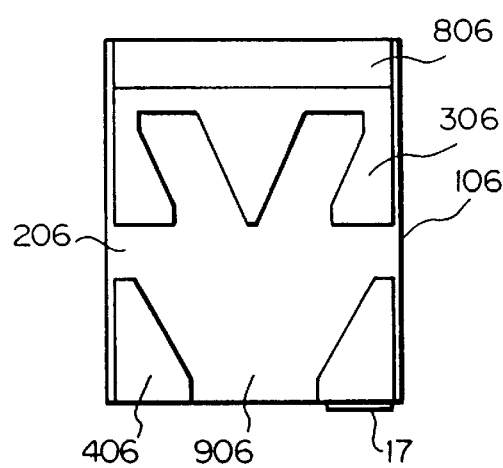

As shown in FIG. 11, in the slider 106 representative of the second modification, the leading rail 306 is identical in configuration with the leading rail 304 of the embodiment. The trailing rails 406 are identical in configuration with the trailing rails 405 of the first modification. The head slider 106 is desirable when in the second embodiment roll rigidity should be increased, and pitch angle should be reduced.

Figure 12:
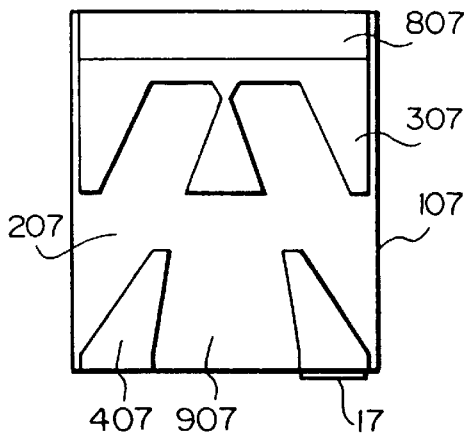

As shown in FIG. 12, in the slider 107 representative of the third modification, the leading rail 307 is identical in configuration with the leading rail 305 of the first modification. The trailing rails 407 are identical with the trailing rails 404 of the second embodiment. The head slider 107 is desirable when in the first modification roll rigidity should be increased, and pitch angle should be reduced.

Figure 13:
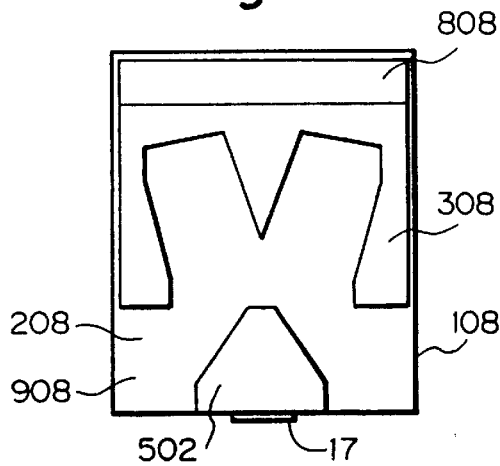

Further, as shown in FIG. 13, in the slider 108 representative of the third modification, the leading rail 308 is similar to the leading rail 304 of the second embodiment. The center rail 502 is implemented as an equilateral triangle or a polygon and located at the center of the trailing edge. The center rail 502 should be as close to a regular polygon as possible so as to reduce the influence of the air bearing condition susceptible to a change in yaw angle, thereby reducing the yaw angle dependency. The trailing rail 502 is usable when any one of the second embodiment and its modifications is provided with a geometry adaptive to a triple-pad type slider.

As stated above, in the second embodiment and its modifications, the leading rail is provided at the leading edge of the air bearing surface facing a recording medium. The leading rail is implemented in the form of a letter E concave toward the tailing edge. The leading edge includes a tapered portion. Three portions, or subrails, of the E-shaped leading rail extending toward the trailing edge are separated from each other by a pair of parallelogrammatic recesses symmetrical to each other with respect to the longitudinal axis of the slider. A pair of triangular rails implement the trailing rail and are symmetrical to each other with respect to the longitudinal axis of the slider, or a single polygonal rail is located at the center of the trailing edge.

The E-shaped leading rail located at the leading edge of the air bearing surface defines a reverse step surface with its pair of parallelogrammatic recesses enclosed by three subrails. Vacuum is generated in the two enclosed regions and cancels the positive load capacity (flying force) ascribable to an increase in the air flow rate. Therefore, the peripheral speed dependency of the flying height can be reduced. At the same time, the flying characteristic and CSS durability can be enhanced to guarantee the reliability of a disk drive.

Further, the pair of parallelogrammatic recesses symmetrical to each other with respect to the longitudinal axis of the slider set up a pressure distribution increasing at both sides of the leading rail. This successfully improves roll ridigity.

Assume the trailing rail implemented by the pair of triangles symmetrical to each other with respect to the longitudinal axis of the slider. Then, as shown, in FIG. 22B, even when the yaw angle ($\theta_Y$) of the slider varies, the two triangles do not noticeably vary the air bearing amount in combination with the three subrails of the leading rail which are inclined by angles of $\theta_1$–$\theta_3$. If follows that the yaw angle dependency of the flying height can be reduced to implement stable flight at the time of seek. This, coupled with the reduced peripheral speed dependency stated earlier, guarantees a constant flying height over the entire track area.

3rd Embodiment

Figure 14A:
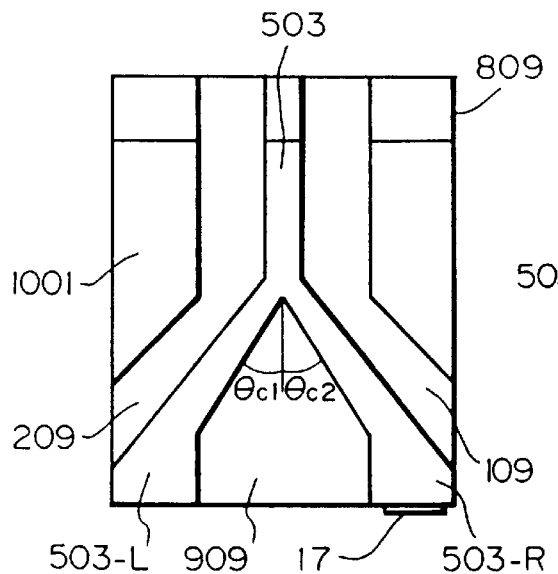
FIG. 14A is a plan view showing a third embodiment of the magnetic head slider in accordance with the present invention.
Figure 14B:
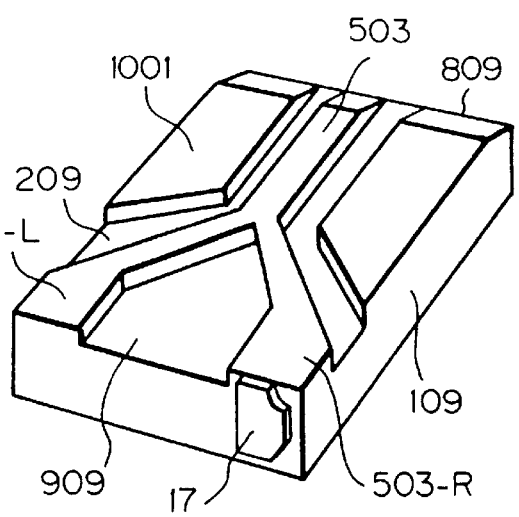
FIG. 14B is a perspective view of the third embodiment.
Figure 15A:
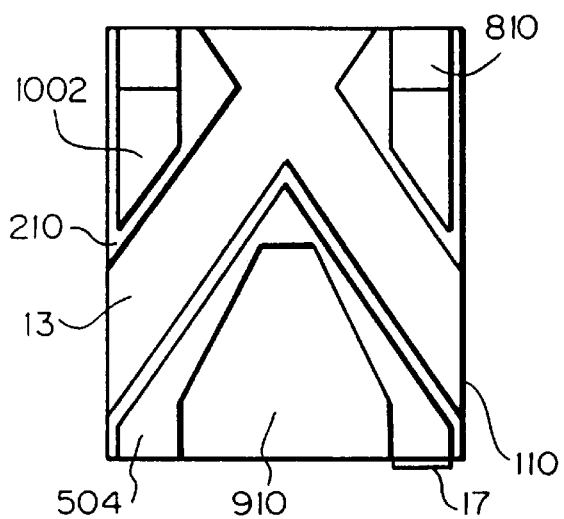
FIGS. 15A and 15B are respectively a plan view and a perspective view showing a modification of the third embodiment.
Figure 15B:
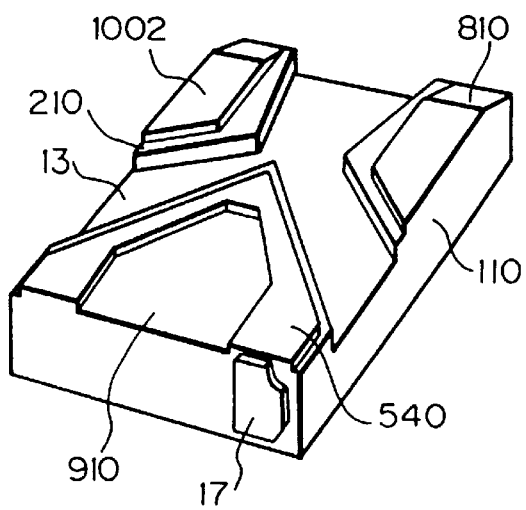

FIGS. 14A and 14B show a third embodiment of the present invention while FIGS. 15A and 15B show a modification thereof. There are shown in FIGS. 14A, 14B, 15A and 15B magnetic head sliders 109 and 110, air bearing surfaces 209 and 210, center rails 503 and 504, side rails 1001 and 1002, the magnetic head 17, tapered portions 809 and 810, recesses 909 and 910, and a machined groove 1003. The sliders 109–110 each is supported by a magnetic head support mechanism on its side opposite to the air bearing surface 209 or 210.

As shown in FIGS. 14A and 14B, the side rails 1001 each extends from the right end or the left end of the leading edge toward the trailing edge, sequentially decreases in width toward the right end or the left end of the slider 109 from around the center of gravity of the slider 109, and terminates before reaching the trailing edge. The center rail 503 extends from the leading edge toward the trailing edge with a small width, and bifurcates into branch rails 503-R and 503-L at the position where the side rails 1001 begin to decrease in width. The branch rails 503-R and 503-L respectively extend to the right and left ends of the trailing edge. Thus, the center rail 503 is generally Y-shaped, as seen from the leading edge side.

The gaps between the side rails 1001 and center rail 503 should preferably be broad enough to prevent dust from accumulating. To reduce the yaw angle dependently, angles $\theta_{c1}$ and $\theta_{c2}$ between the branch rails 503-R and 503-L and the longitudinal axis of the slider should preferably be equal to or greater than the expected yaw angle.

As shown in FIGS. 15A and 15B, the slider 110 representative of the modification of the third embodiment is desirable when the recess of the third embodiment cannot be deep due to machining limitations. As shown, the machined groove 1003 is formed between the side rails 1002 and the center rail 504, so that the flying height can be prevented from increasing due to a shallow recess. In this case, the center rail 504 is generally V-shaped, as seen from the leading edge side.

As stated above, in the third embodiment and its modification, a pair of side rails are provided at the right and left ends of the leading edge of the air bearing surface while a single center rail is located at the center of the trailing edge. The side rails each extends toward the trailing edge, sequentially decreases in width, and terminates before reaching the trailing edge. The center rail extends linearly from the leading edge toward the trailing edge and then bifurcates. The bifurcated portions or branch rails extend away from each other to the right and left ends of the trailing edge while sequentially increasing in width.

In the above configuration, a reverse step surface is formed from the bifurcating point of the center rail toward the trailing edge, causing vacuum to be generated in the area enclosed by the branch rails. This successfully reduces the peripheral speed dependency of the flying height, as stated earlier, and in addition implements a sufficient effective load (positive load capacity) and sufficient air film rigidity despite a light load.

Figure 22C:
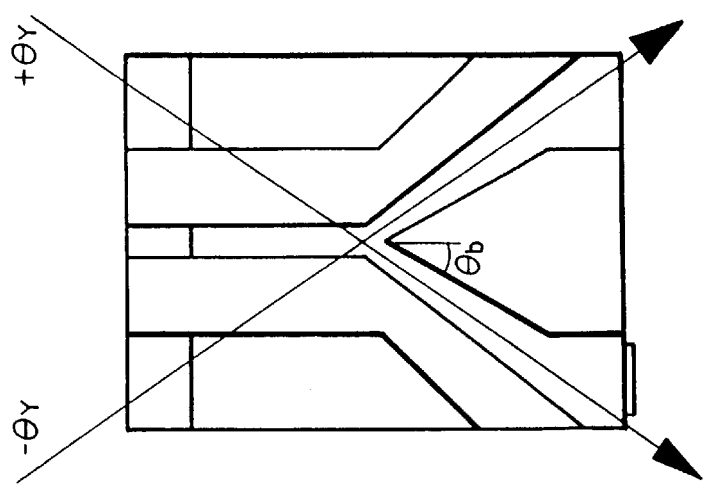
FIGS. 22A–22C each shows a specific relation between the rail geometry of a magnetic head slider and the yaw angle achievable with the present invention.
Figure 22B:
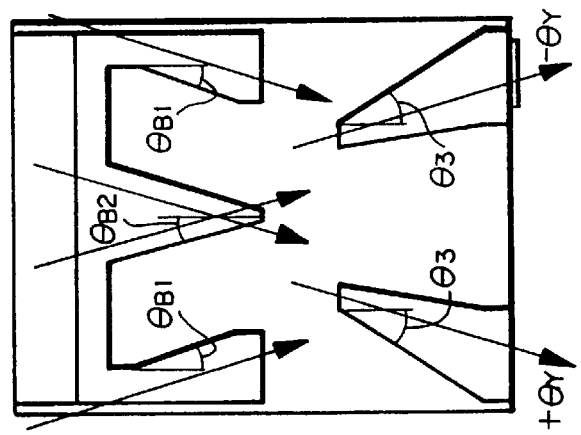
Figure 22A:
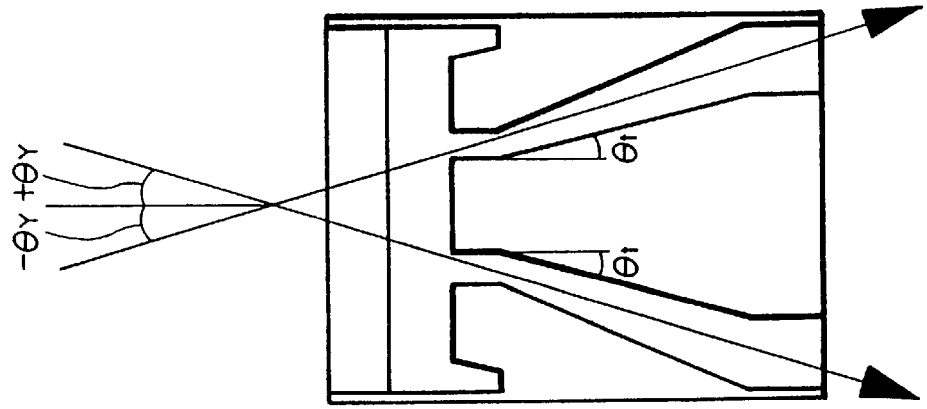

As shown in FIG. 22C, the branch rails flared toward the trailing edge each is inclined by an angle of ±θb relative to the longitudinal axis of the slider. Therefore, even when the yaw angle of the slider varies due to a change in track position, the air stream coming in through the leading edge reaches the trailing edges (air outlet ends) of the branch rails more easily, preventing the air bearing amount from noticeably varying. It follows that a change in flying height ascribable to a change in yaw angle can be reduced so as to ensure stable flight at the time of seek. This, coupled with the reduced peripheral speed dependency stated earlier, guarantees uniform flight over the entire track area.

Figure 20:
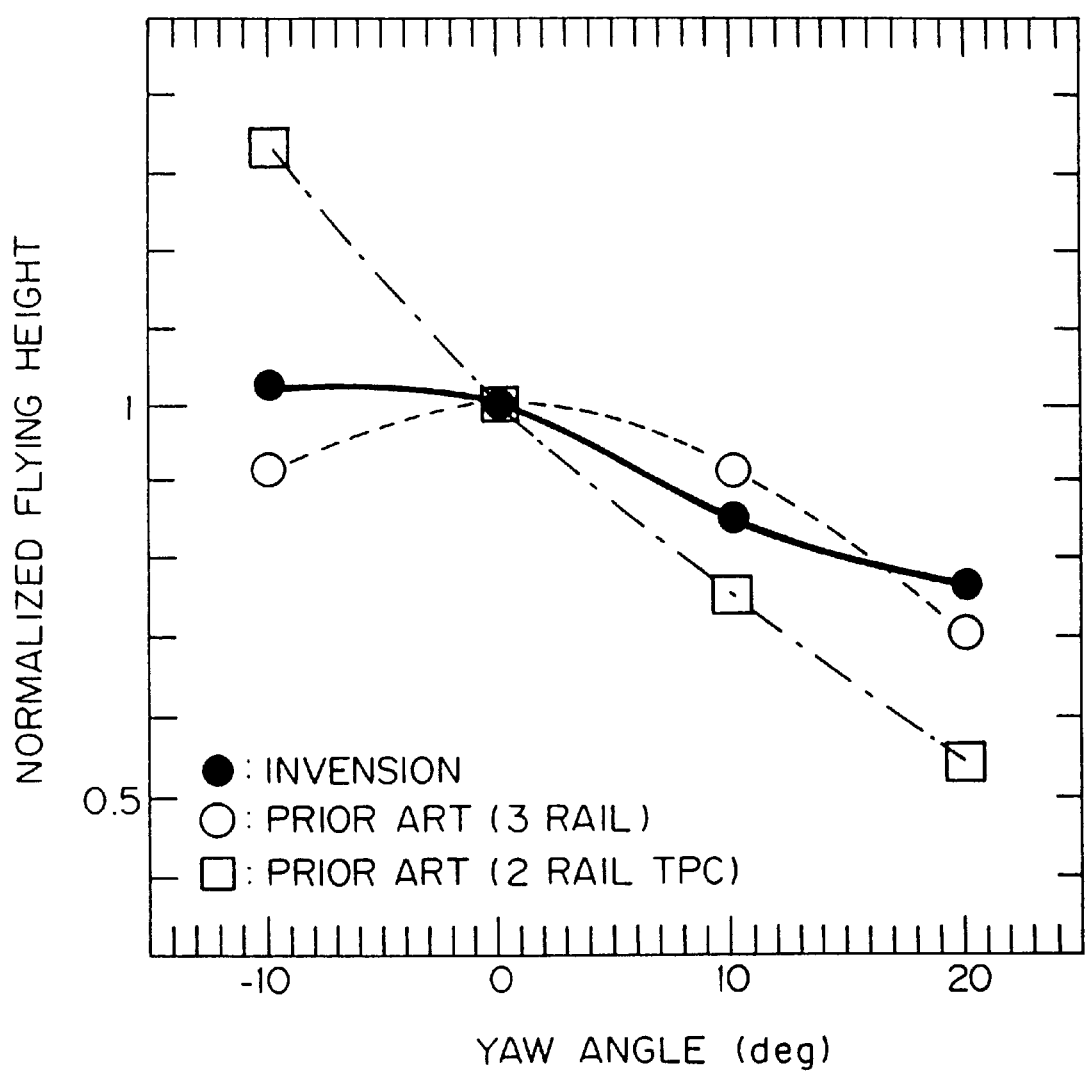
FIG. 20 shows the yaw angle dependency of a flying height also particular to the present invention.
Figure 21:
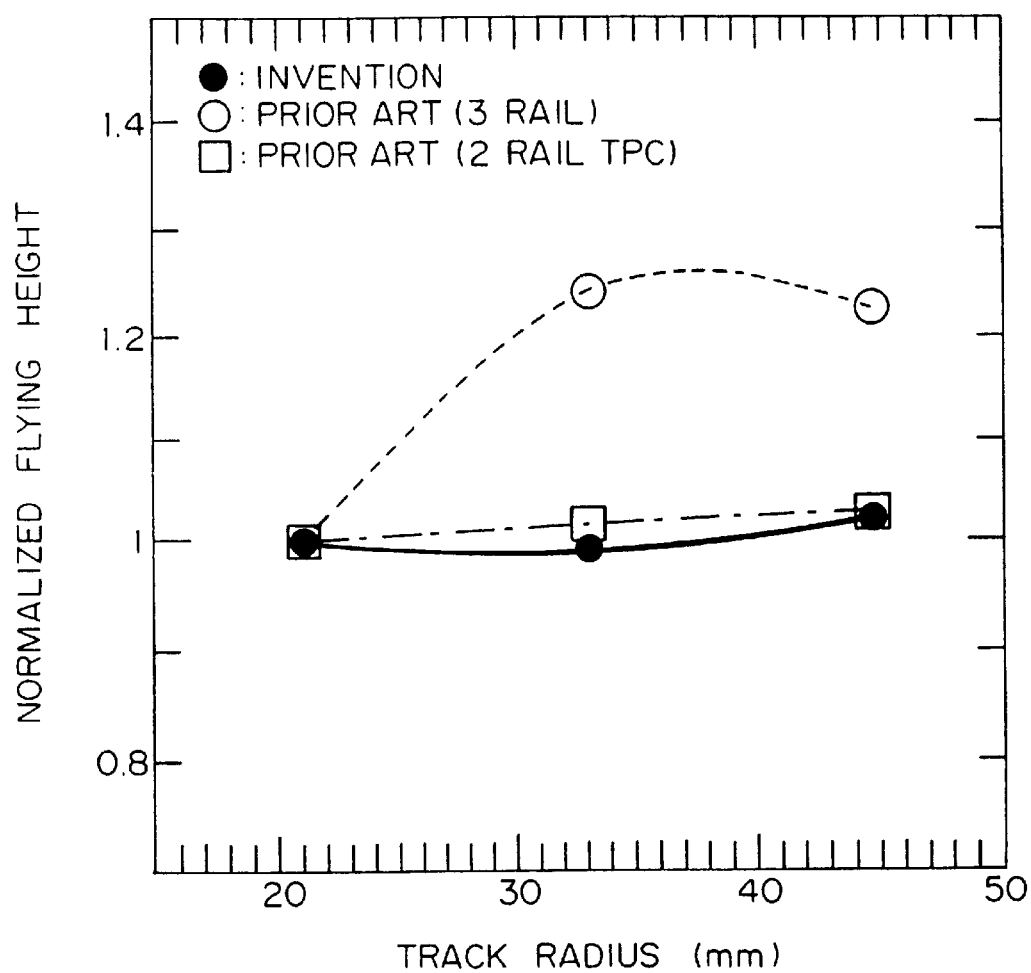
FIG. 21 shows the track radius dependency of a flying height also particular to the present invention.

FIGS. 18 and 20 compare the present invention and the conventional technologies with respect to a relation between the variation of peripheral speed and the flying height and a relation between the variation of yaw angle and the flying height. In accordance with the present invention, the peripheral speed dependency and yaw angle dependency of the flying height are less noticeable than those of the conventional technologies. Therefore, as shown in FIG. 21, the present invention is capable of reducing the variation of the flying height dependent on the radial position of the track. With the present invention, it is possible to realize a constant flying height which is the key to high density recording.

The conventional double-rail type TPC slider is comparable with the present invention as to the constant flying height. However, this type of conventional slider achieves a constant flying height by causing the variation of the flying height ascribable to the varying peripheral speed and the variation of the flying height ascribable to the varying yaw angle to cancel each other. Therefore, in the conventional slider, the flying height is greatly dependent on the peripheral speed and yaw angle, obstructing stable flight at the time of high speed seek. As a result, a disk drive with such a slider lacks in reliability in the low height region where a sufficient margin is not available as to the flight.

In summary, in accordance with the present invention, a magnetic head slider generates vacuum on a reverse step surface implemented by an air bearing surface. A rail forming the reverse step surface is so configured as to reduce the variation of a pressure profile ascribable to a yaw angle. The slider therefore reduces both the peripheral speed dependency and yaw angle dependency of the flying height of a magnetic head at the same time. It follows that the flying height of the head is constant over the entire track area, and stable flight is ensured during high speed seek even when a margin as to the low flying height is limited. This, coupled with the fact that the pressure load to act on the slider can be reduced at the design stage, reduces CSS wear and improves the flying characteristic and thereby enhances the reliability of a disk drive.

Various modifications will become possible for those skilled in the art after receiving the teachings of the present disclosure without departing from the scope thereof.

What is claimed is:

1. A magnetic head slider having an air bearing surface and capable of flying due to an air bearing between said air bearing surface and a recording medium, said slider comprising:

a generally E-shaped leading rail formed at an air inlet end of said air bearing surface, said leading rail being unitary and having three subrails extending generally toward an air outlet end of said air bearing surface and forming said E-shape; and a pair of triangular trailing rails respectively located at a right end and a left end of said air outlet end.

2. A slider as claimed in claim 1, wherein said trailing rails are separate from said leading rail.

3. A magnetic head slider having an air bearing surface and capable of flying due to an air bearing between said air bearing surface and a recording medium, said slider comprising:

a generally E-shaped leading rail formed at an air inlet end of said air bearing surface, said leading rail being unitary and having three subrails extending toward an air outlet end of said air bearing surface and forming said E-shape, said subrails being separated from each other by a pair of parallelogrammatic recesses which are symmetrical to each other with respect to a longitudinal axis of said slider; and a pair of triangular trailing rails respectively located at a right end and a left end of said air outlet end and symmetrical to each other with respect to the longitudinal axis of said slider.

4. A slider as claimed in claim 3, wherein said E-shaped leading rail is configured such that said pair of recesses generally form a letter V, as seen from said air outlet side.

5. A slider as claimed in claim 4, wherein said pair of trailing rails each increases in width from a side of said slider toward said air outlet end.

6. A slider as claimed in claim 3, wherein said trailing rails are separate from said leading rail.

7. A slider as claimed in claim 3, wherein said E-shaped leading rail is configured such that said pair of recesses generally form a letter V, as seen from said air inlet side.

8. A slider as claimed in claim 7, wherein said pair of trailing rails each increases in width from a side of said slider toward said air outlet end.

9. A magnetic head slider heaving an air bearing surface and capable of flying due to an air bearing between said air bearing surface and a recording medium, said slider comprising:

a generally E-shaped leading rail formed at an air inlet end of said air bearing surface, said leading rail having three subrails extending generally toward an air outlet end of said air bearing surface and forming said E-shape; and a pair of triangular trailing rails respectively located at a right end and a left end of said air outlet end, wherein said trailing rails are separate from said leading rail.

10. A magnetic head slider having an air bearing surface and capable of flying due to an air bearing between said air bearing surface and a recording medium, said slider comprising:

a generally E-shaped leading rail formed at an air inlet end of said air bearing surface, said leading rail having three subrails extending toward an air outlet end of said air bearing surface and forming said E-shape, said subrails being separated from each other by a pair of parallelogrammatic recesses which are symmetrical to each other with respect to a longitudinal axis of said slider; and a pair of triangular trailing rails respectively located at a right end and a left end of said air outlet end and symmetrical to each other with respect to the longitudinal axis of said slider, wherein said trailing rails are separate from said leading rail.

* * * * *

UNITED STATES PATENT AND TRADEMARK OFFICE
CERTIFICATE OF CORRECTION

PATENT NO.   : 6,172,851 B1
DATED        : January 9, 2001
INVENTOR(S)  : Motoyasu Utsunomiya Page 1 of 1

It is certified that error appears in the above-identified patent and that said Letters Patent is hereby corrected as shown below:

<u>Column 5,</u>
Line 40, delete "$\theta_{r2}$" insert -- $\theta_{+2}$ --

<u>Column 8,</u>
Line 12, delete "If" insert -- It --

Signed and Sealed this

Sixteenth Day of October, 2001

*Attest:*

*Attesting Officer*

NICHOLAS P. GODICI
*Acting Director of the United States Patent and Trademark Office*